July 7, 1970 W. D. TAYLOR 3,519,319
REMOVABLE TILT-DOWN DRAWER
Filed Nov. 6, 1968 8 Sheets-Sheet 1

INVENTOR.
WILLIAM D. TAYLOR
BY Hamilton, Cook,
Renner & Kenner
ATTORNEYS

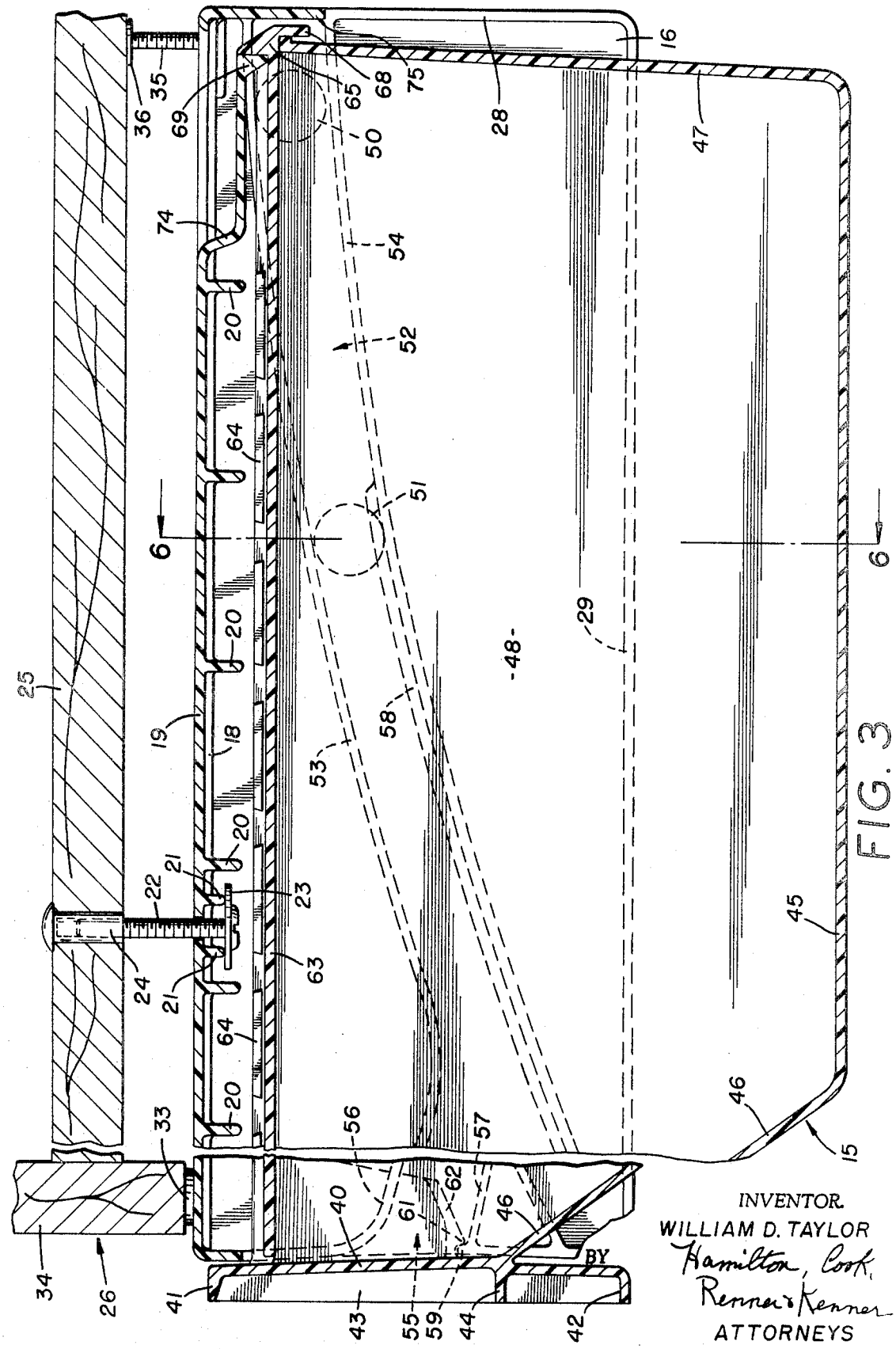

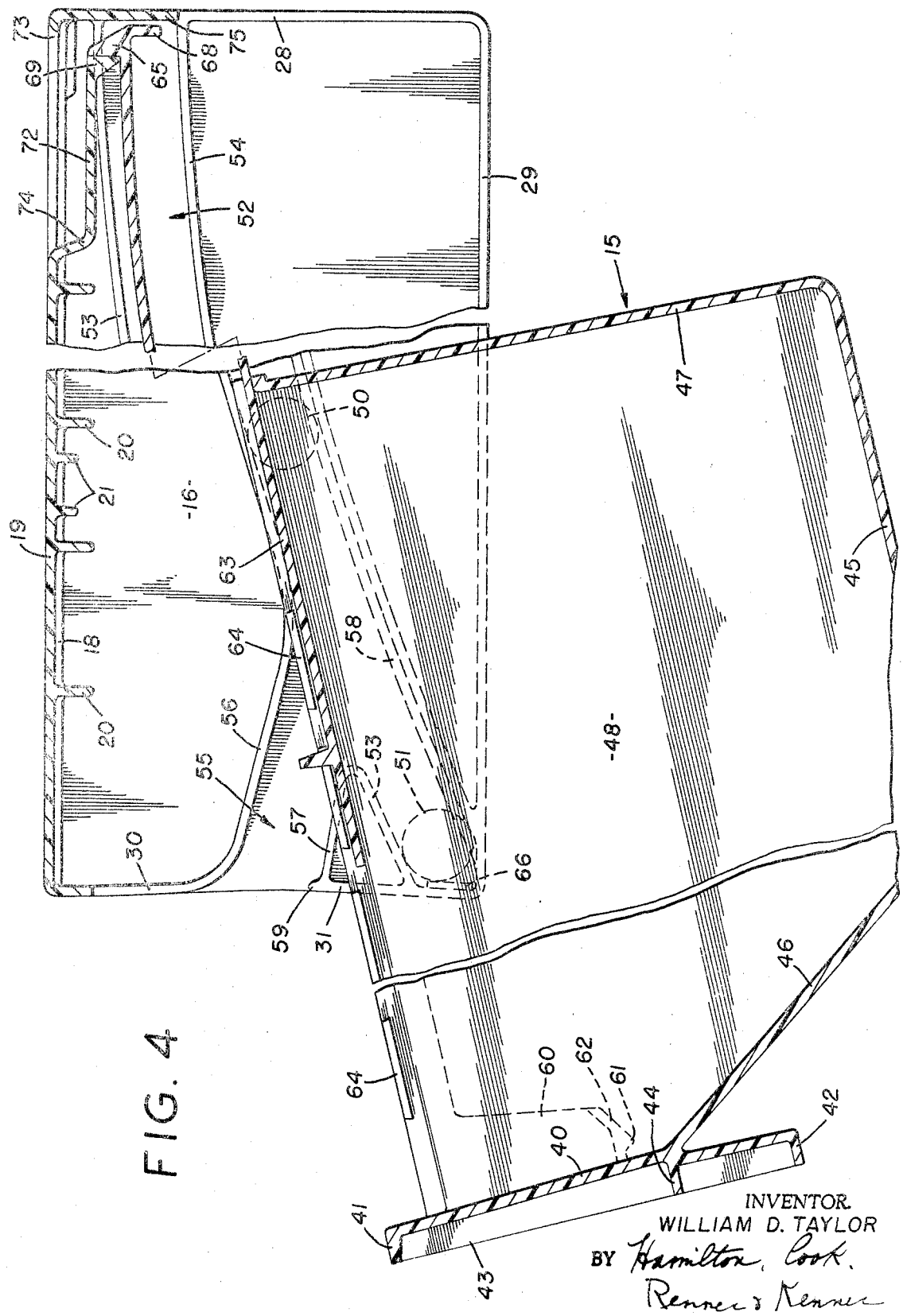

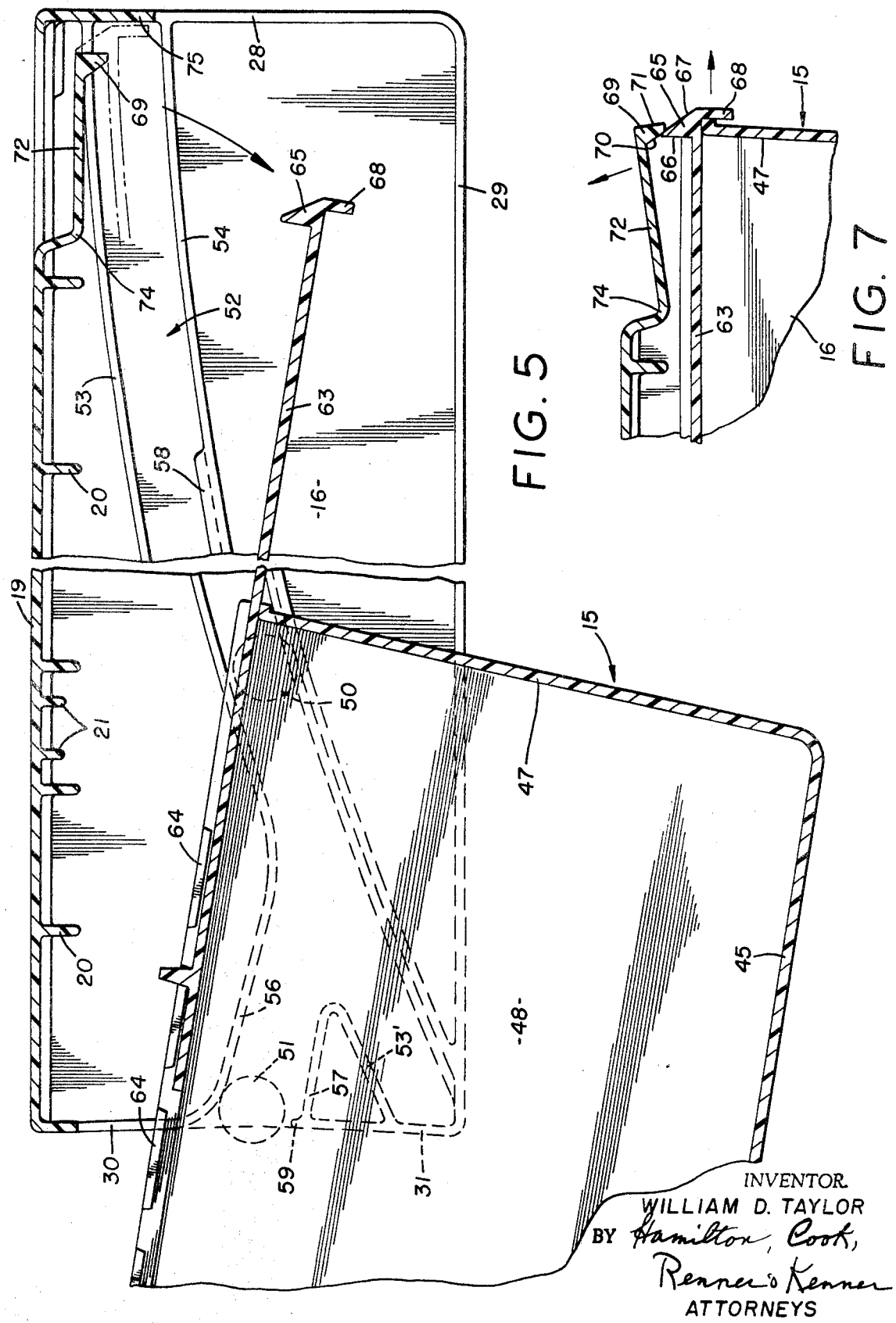

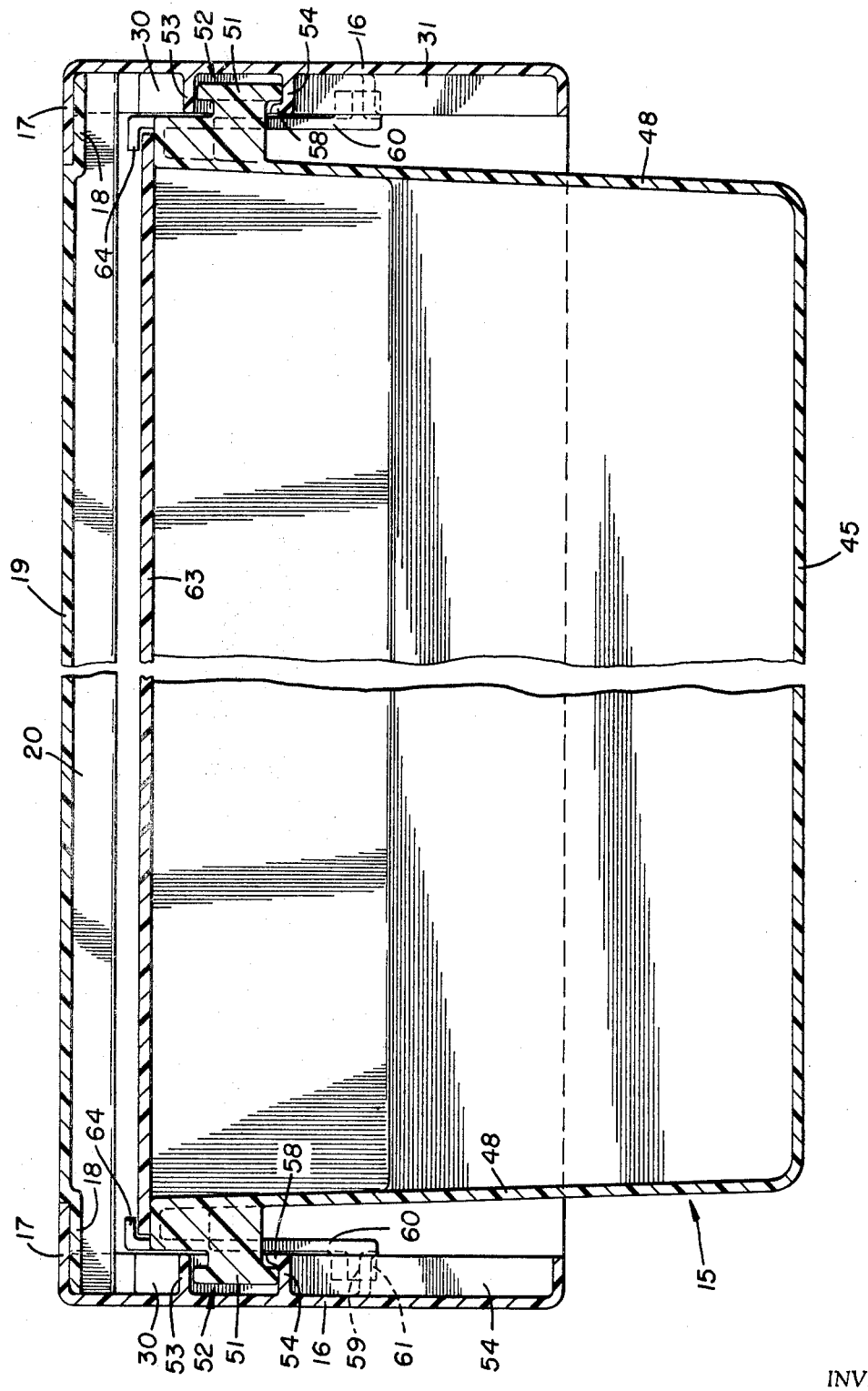

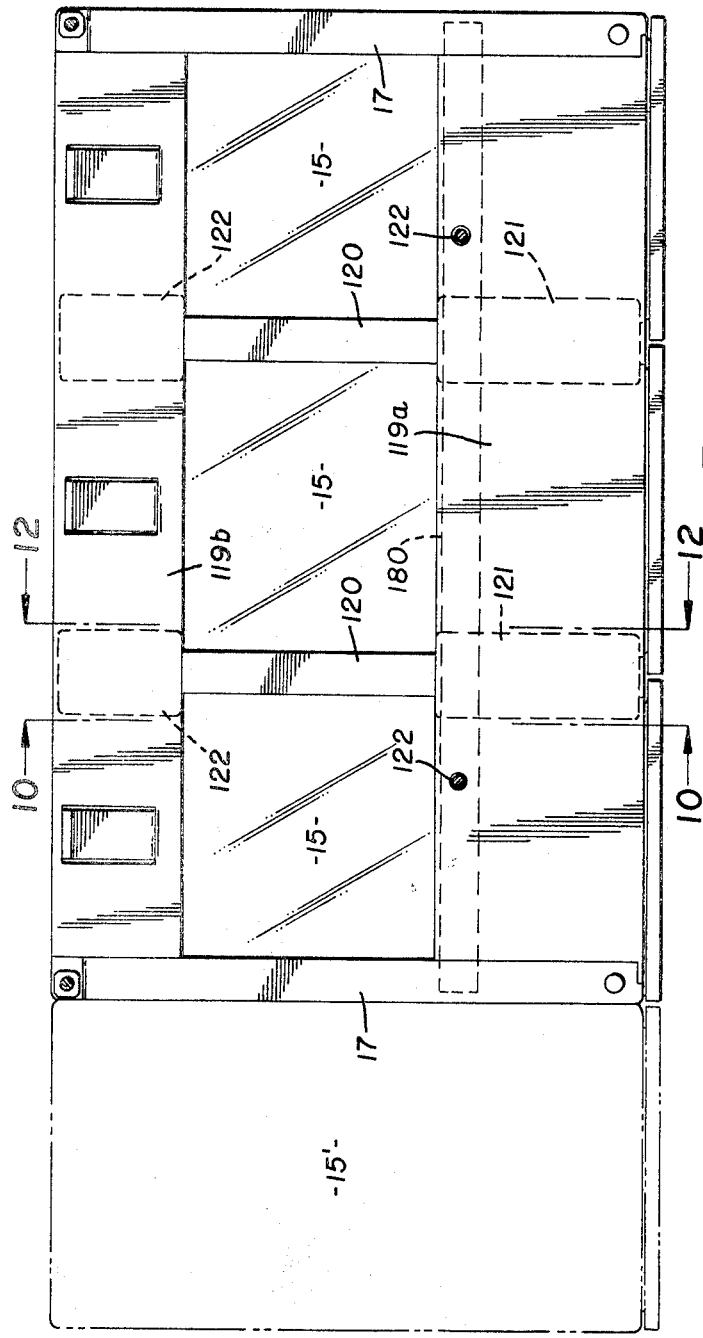
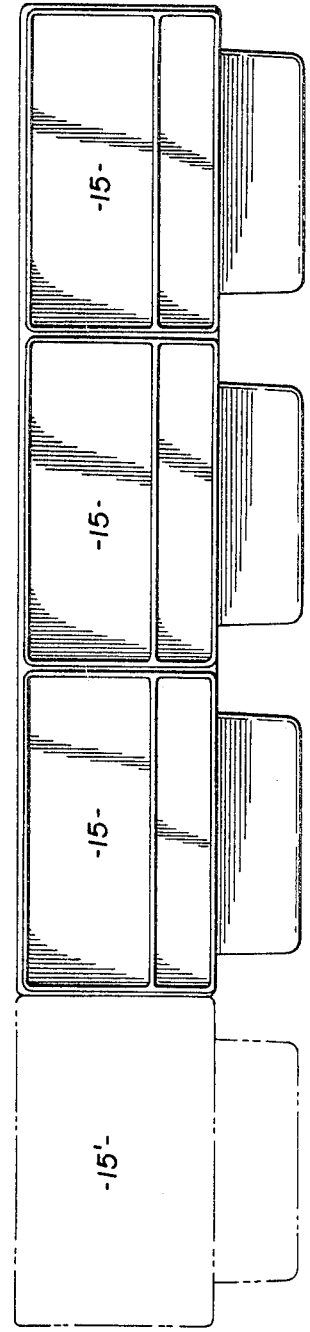

July 7, 1970 W. D. TAYLOR 3,519,319
REMOVABLE TILT-DOWN DRAWER

Filed Nov. 6, 1968 8 Sheets-Sheet 7

INVENTOR.
WILLIAM D. TAYLOR
BY *Hamilton, Cook,*
*Renner & Kenner*
ATTORNEYS

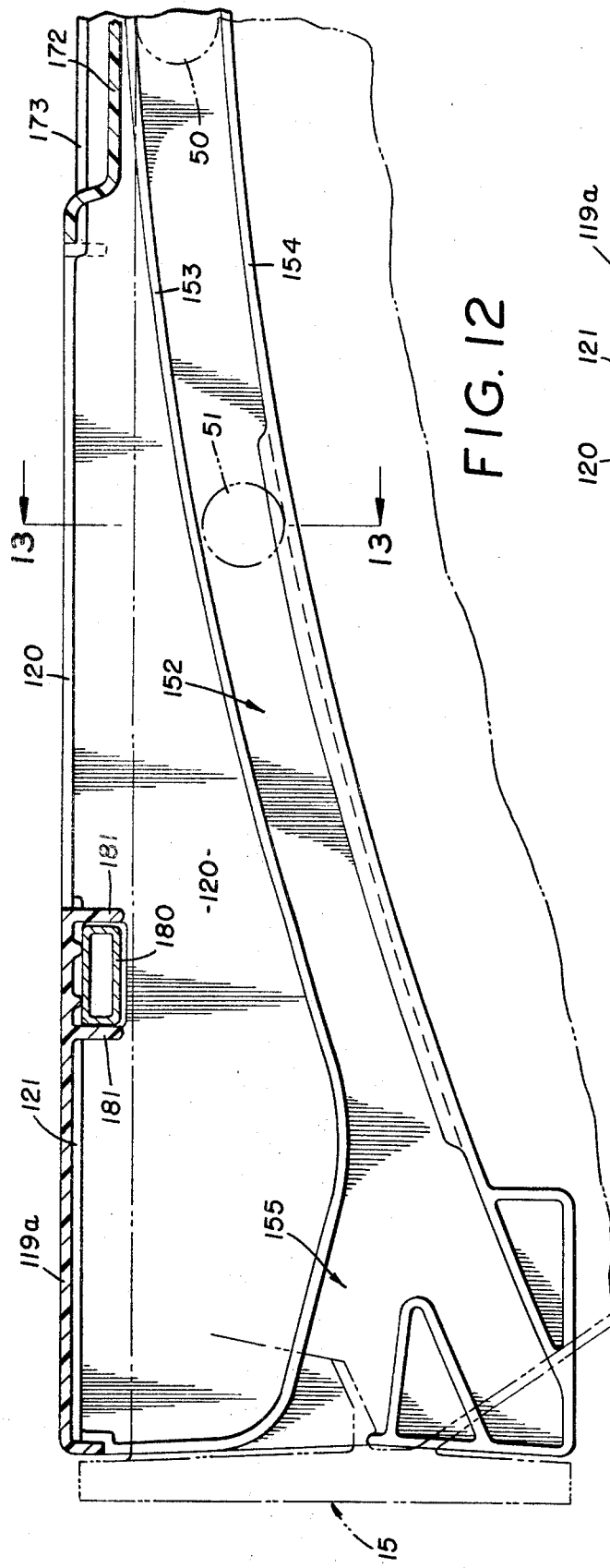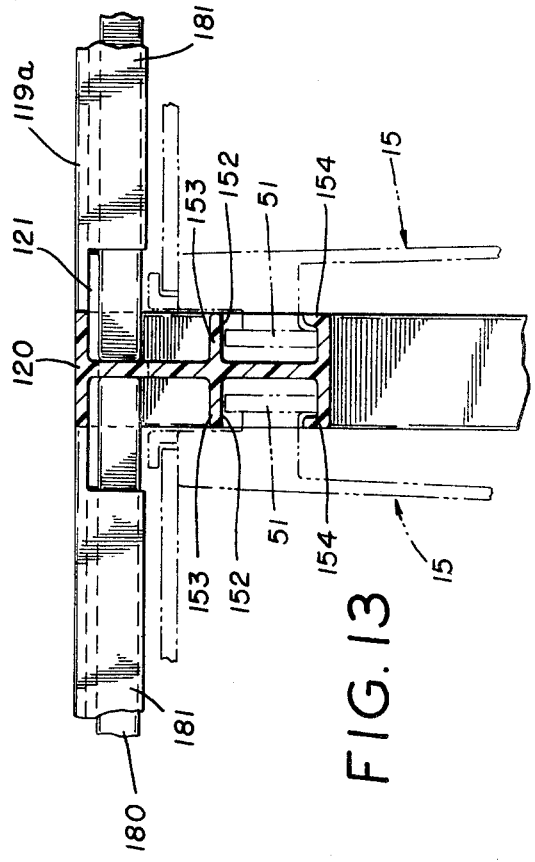

United States Patent Office
3,519,319
Patented July 7, 1970

3,519,319
REMOVABLE TILT-DOWN DRAWER
William D. Taylor, Wooster, Ohio, assignor to Rubbermaid Incorporated, Wooster, Ohio, a corporation of Ohio
Filed Nov. 6, 1968, Ser. No. 773,772
Int. Cl. A47f 5/08; A47b 67/02
U.S. Cl. 312—246                    14 Claims

ABSTRACT OF THE DISCLOSURE

A storage drawer unit having a slidable transparent cover mounted in a single carrier frame or in multiple units in a multiple carrier frame, the units having side cams slidable in inclined tracks in the carrier frames causing downward tilting of the drawer or drawers when pulled out and the transparent cover or covers being latched in retracted position during such downward tilting and outward extension, said drawer units being removable with said covers thereon by tilting the units upwardly when pulling them out of said carrier frames.

BACKGROUND OF THE INVENTION

Certain prior drawer constructions have provided tilt-down drawers which come to a jarring stop when pulled out and are not stable while in pulled-out position. Such drawers do not have individual covers. Moreover, they have been difficult to remove and the carriers therefor are difficult to install in proper alignment.

SUMMARY OF THE INVENTION

The present invention provides a unitary frame for single or multiple drawer units for storing dry foods and the like, which frame is easily attached to existing cabinets and easily adjustable to proper alignment. The drawer units each have separate transparent covers which normally remain in place in the carrier frame when the drawer is pulled out, thereby making the contents of the drawer accessible, and which remain on the drawer when the drawer is removed and transported to another place.

It is an object of the present invention to provide an improved tilt-down drawer unit construction and a single and multiple carrier frame therefor.

Another object is to provide a slidable cover for each drawer unit which stays retracted when the unit is pulled out in tilt-down position, and which disengages from the carrier and stays on the unit when it is bodily removed from the carrier frame for use to seal-in the contents of the drawer.

A further object is to provide an improved tilt-down and removable drawer construction which is economically constructed and easily installed.

These and other objects are accomplished by the improved drawer and carrier constructions disclosed herein, certain modifications thereof being within the scope of the appended claims.

DESCRIPTION OF THE DRAWINGS

FIG. 3 is an enlarged vertical sectional view on line 3—3 of FIG. 2.

FIG. 4 is a similar view, partly broken away, showing the drawer in fully withdrawn tilted down position.

FIG. 5 is a similar view showing the drawer partially withdrawn and tilted upwardly for removal.

FIG. 6 is a transverse sectional view on line 6—6 of FIG. 3.

FIG. 7 is a partial sectional view similar to FIG. 3 showing the keeper on the carrier being cammed upwardly to allow the latch on the drawer cover to be snapped in place.

FIG. 8 is a plan view similar to FIG. 2 of a triple unit with a single unit positioned alongside in phantom lines.

FIG. 9 is a front elevation thereof.

FIG. 12 is a partial sectional view on line 12—12 of FIG. 8.

FIG. 13 is a partial sectional view on line 13—13 of FIG. 12.

DECRIPTION OF PREFERRED EMBODIMENTS

Figure 1:
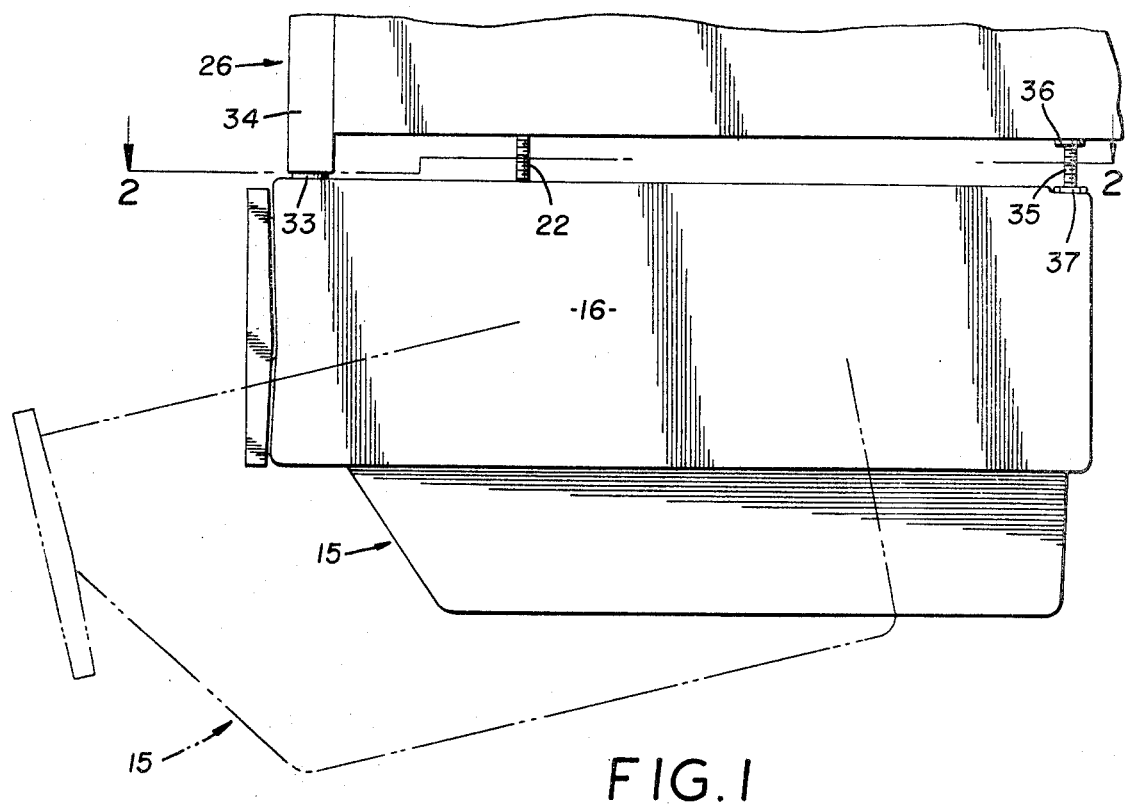
FIG. 1 is a side elevation of a single drawer unit in closed position in a carrier frame hung on the underside of a cabinet, a partially withdrawn downwardly tilted position of the drawer being indicated in phantom lines.
Figure 2:
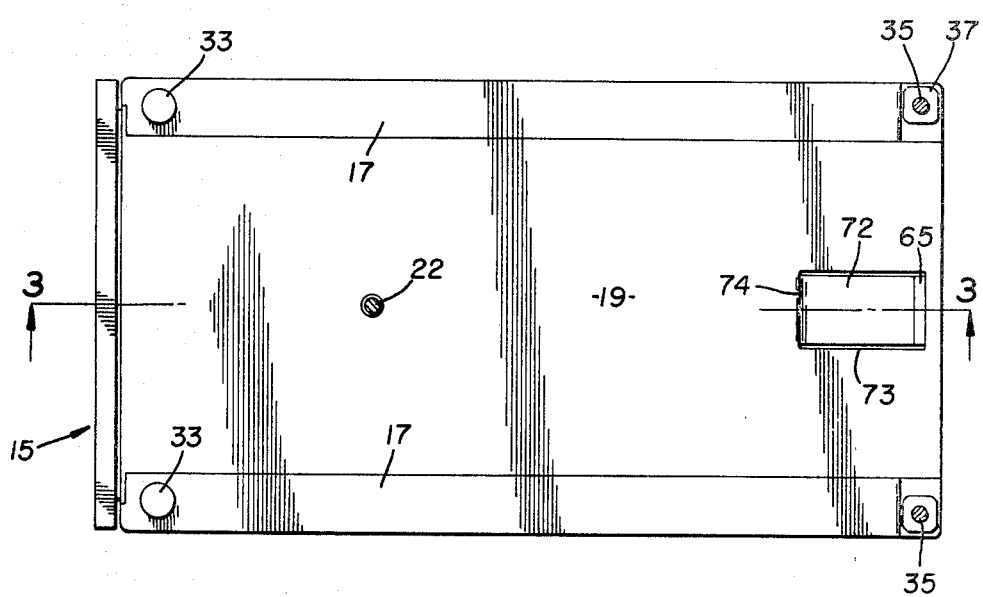
FIG. 2 is a plan view on line 2—2 of FIG. 1.

Referring to FIGS. 1–7, the drawer indicated generally at 15 is slidably supported in a carrier frame having opposed side walls 16, with inturned top flanges 17 which overlie side flanges 18 on the top frame wall 19 interconnecting the side walls 16, as seen in FIG. 6. The flanges 17 and 18 may be connected by ultrasonic welding, if desired. Preferably, the top wall 19 has longitudinally spaced depending reinforcing flanges 20 extending transversely thereof.

Between two of the ribs 20 and medially of the side flanges 18, the top wall 19 is provided with two spaced shallow ribs 21, and between the ribs 21 the top wall has an aperture through which a bolt 22 extends for hanging the top wall 19 on the underside of a kitchen cabinet or cupboard, and the like. A washer 23 under the bolt head abuts the ribs 21, and the bolt 22 extends upwardly and is threaded into an expansion sleeve 24 inserted downwardly into a drilled hole in the bottom shelf 25 of a cabinet 26.

The side walls 16 have vertically extending inturned flanges 28 along their rear edges and horizontal flanges 29 along their bottom edges. Along the front edges of the side walls are upper inturned flanges 30 and lower inturned flanges 31 which merge with ribs or flanges forming channel tracks on the inner surfaces of the side walls, in a manner to be described.

Resilient pads 33 are provided on the front ends of flanges 17 for contacting the underside of the front frame member 34 of cabinet 26, and adjusting screws 35 are screwed into the rear ends of flanges 17. The screws 35 have pads 36 on their upper ends for adjustably abutting the underside of the cabinet, and T-nuts 37 are provided on the screws to hold them in adjusted position.

As shown in FIGS. 3 and 4, the drawer 15 has a front wall 40 which may have forwardly extending top, bottom, and side flanges 41, 42 and 43, respectively. A horizontal reinforcing flange 44 may be provided adjacent to bottom flange 42, and flange 44 facilitates grasping the front of the drawer to manipulate it. Preferably, the front wall 40 is connected to the bottom wall 45 of the drawer by an inclined wall 46 extending downwardly inward from behind the horizontal flange 44. The bottom wall 45 is connected to the rear wall 47 and the side walls 48 of the drawer.

The drawer 15 is slidably mounted in the side walls 16 of the carrier frame by means of two cylindrical cam or guide elements projecting laterally outward from each side wall 48 and slidably engaged in channel tracks on the inner surfaces of the side walls 16 of the carrier frame. The guide elements comprise rear elements 50 located at the upper rear corners of the side walls 48, and front elements 51 spaced forwardly and slightly downwardly a a predetermined distance from the rear elements. The elements 50 and 51 preferably have circumferential flanges at their outer ends for riding in the tracks on the carrier frame.

The guide elements are slidably engaged in downwardly curved forwardly extending tracks 52, one on the interior surface of each carrier side wall 16. The tracks are formed by spaced-apart parallel ribs or flanges 53 and 54 and extend from near the upper rear corners to the front lower corners of the walls 16. Each track is closed at its rear end by the rear edge flange 28 and at its front end by the front edge flange 31. Branch tracks 55 connect with the tracks 52 near the front ends thereof and their front ends are open for allowing removal of the guide elements 50 and 51 therethrough as shown in FIG. 5.

As best shown in FIG. 5, each lower track flange 54 extends continuously from rear edge flange 28 to the bottom flange 29 adjacent the corner formed by flange 29 and front edge flange 31. Each upper track flange 53 is interrupted near its front end and connected to upper and lower track flanges 56 and 57, respectively, of track 55. Flange 56 merges with front edge flange 30, and flange 57 connects with front edge flange 31, forming a triangle with the front portion 53' of track flange 53.

Extending forwardly from the position of cam elements 51 in the closed position of the drawer shown in FIG. 3, each track flange 54 has along its inner edge an upwardly extending lip flange 58 which retains the cam elements in the tracks 52 if the drawer is heavily loaded when pulled out, which might otherwise allow the cam elements to slip out of the tracks by spreading the side walls 16 of the carrier apart.

At the intersection of each track flange 57 with the front edge flange 31 an upstanding lip 59 is provided, and as shown in FIGS. 4 and 6 a depending side flange 60 is provided at the front of the drawer 15. The bottom of each side flange 60 has a laterally outwardly extending lip with a downwardly projecting hump 61 therein for engaging behind the lip 59 and retaining the drawer in the fully closed position of FIG. 3. An upwardly inclined surface 62 extends rearwardly of said hump 61.

The drawer 15 is provided with a slidable cover 63 which is preferably transparent plastic material having a certain amount of flexibility. The side edges of the cover are slidably received in longitudinal opposed channels formed by intermittent inturned angular flanges 64 extending along the top side edges of the drawer. The flanges are preferably made intermittent to facilitate molding.

Medially of the rear edge of cover 63 an upwardly projecting keeper 65 is formed. The keeper has a front vertical surface 66 and a rearwardly inclined rear surface 67 (FIG. 7), and a depending flange 68 for engaging behind the rear wall 47 of the drawer when the cover is fully closed over the drawer. The keeper 65 is adapted to engage behind a depending latch 69 formed at the rear edge of the top wall 19 of the carrier frame. The latch has an inclined front surface 70 for coacting with inclined keeper surface 67, and a vertical rear surface 71 for engaging the vertical keeper surface 66 (FIG. 3).

The depending latch is formed on the rear edge of a rectangular ear 72 positioned within a rectangular cutout 73 medially of the rear portion of the carrier top wall 19 (FIG. 2), the sides of the ear 72 being separate from the cutout and the front end of the ear being hinged to the top wall by the curved portion 74. Obviously, the plastic material of which the cover is made may be of the type which will provide the portion 74 with the well-known "living hinge" property when treated to produce the required molecular orientation in the hinge portion 74.

When the drawer with its cover 63 thereon is pushed rearwardly in the carrier frame the keeper swings the latch 69 upwardly about the hinge 74, as shown in FIG. 7, until it snaps downwardly in front of the keeper, as shown in FIG. 3. A depending transverse rear wall 75 on the frame prevents further rearward motion of the drawer. As the drawer closes, the inclined surfaces 62 of the side flanges 60 ride upwardly on lips 59 until the humps 61 drop behind the lips to hold the drawer fully closed.

When it is desired to open the drawer, the front thereof is lifted slightly to elevate the humps 61 above lips 59, and allow the drawer to move forwardly, the cam elements 50 and 51 sliding downwardly in the tracks 52 until the drawer reaches the downwardly tilted open position of FIG. 4. During this movement, the outer flanges on elements 50 and 51 are retained within the track 52 by the lip flange 58 to prevent any spreading apart of the side frames 16 due to the cantilevered load of the extending drawer. Resilient pads or bumpers 66 may be placed in the front closed ends of tracks 52 to cushion the impact of the cam elements 51 when they reach the closed ends of the tracks.

As the drawer moves forward from the closed position of FIG. 3, the cover 63 will be held against any forward movement by the engagement of the latch 69 and keeper 65, so that the top of that portion of the drawer that is pulled out is automatically opened to make its contents exposed and conveniently accessible. Since the drawer moves forward in a slightly arcuate path, as determined by the track 52, and a portion of the cover 63 remains in the channels at the tops of the drawer side walls, the cover is somewhat curved as the drawer moves to its open position, as shown in FIG. 4, thus making the retention between latch 69 and keeper 65 more positive.

To remove the drawer with the cover from the carrier frame, some upward pressure is applied to the front of the drawer to tilt it as it is pulled forward toward its open position and guide the front guide elements 50 into the branch tracks 55. By supporting the bottom of the drawer with one hand, it can be easily withdrawn with the other hand while guiding the rear guide elements 51 out through the branch tracks. As the front of the drawer is tilted upwardly the keeper 65 on the rear end of the cover is tilted downwardly, disengaging it from the latch 69, as indicated in FIG. 5. After the drawer and cover are completely removed from the carrier frame, the cover may be slid forwardly to close the drawer, and the drawer may be bodily transported to any convenient location while maintaining the contents of the drawer enclosed and sealed in. On re-inserting the drawer, as it is pushed inwardly in the carrier frame to fully closed position, the keeper 65 will slide under the latch 69 in the manner shown in FIG. 7 until the latch snaps downwardly in front of the keeper in the position of FIG. 3.

Referring to the embodiment shown in FIGS. 8–13, a multiple carrier frame is provided for enclosing a plurality of drawers 15 of identical construction to the drawer shown in FIGS. 1–7. A carrier frame for three drawers is shown, but it will be understood that the frame may be designed to accommodate two or more than three drawers. Also, the multiple frame matches the single frame of FIGS. 1–7 in height and depth, so that a single frame and drawer unit 15' may be mounted alongside of the multiple frame, as indicated by phantom lines in FIGS. 8 and 9.

The carrier frame for the three drawers 15 has two outer side walls identical with the side walls 16 in the embodiment of FIGS. 1–7, with inturned top flanges 17 overlying and connected to side flanges on front and rear horizontal top frame walls or spacers 119a and 119b extending laterally across the frame. The three spaces for the drawers 15 are provided by two T-shaped center rails 120 spaced laterally inward from the outer side walls, and having front platforms 121 for supporting the front spacers 119a and rear platforms 122 for supporting the rear spacers 119b.

Figure 10:
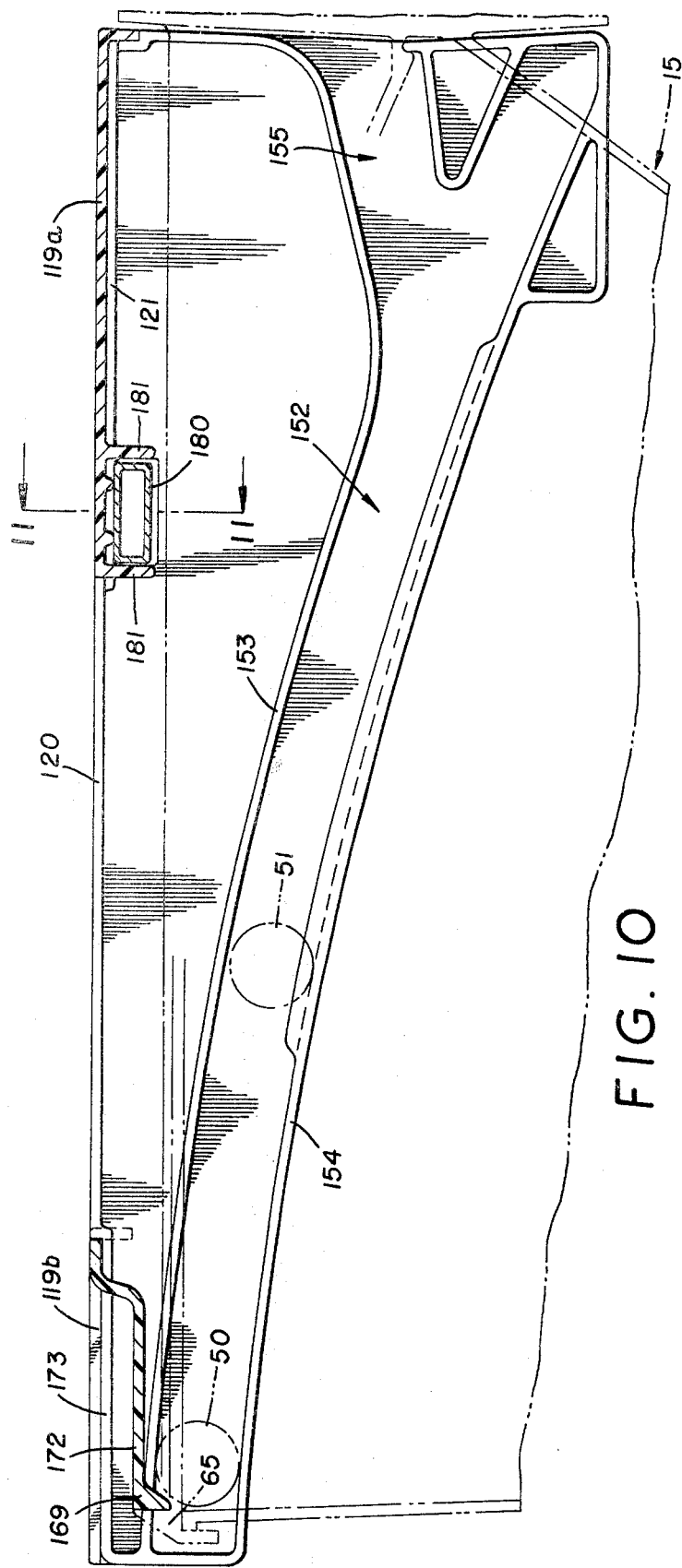
FIG. 10 is a partial vertical sectional view on line 10—10 of FIG. 8.
Figure 11:
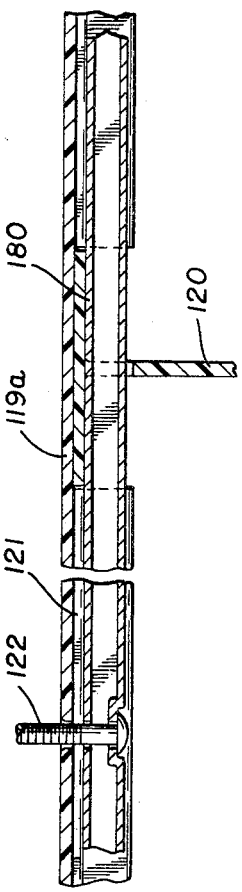
FIG. 11 is a partial sectional view on line 11—11 of FIG. 10.

As shown in FIGS. 10, 12 and 13, the rails 120 have upper and lower track flanges 153 and 154 on both sides forming downwardly curved forwardly extending tracks 152 and branch tracks 155 matching the tracks 52 and 55 on the side walls for slidably receiving the guide elements 50 and 51 on the adjacent drawers. Because of the span of the triple carrier frame the front spacer 119a is preferably reinforced by a hollow metal beam 180 extending laterally through the center rails 120 and under the flanges 17 of the side walls (FIG. 8). Preferably, the spacer 119a is provided with transverse depending ribs 181 straddling the beam 180. Two attaching bolts 122 may be secured to the beam 180 at suitable locations for hanging the carrier frame on the underside of a cabinet similarly to the manner of hanging a single carrier frame.

The rear spacer frame member 119b is provided with three rectangular ears 172 within cut-outs 173, said ears having depending latches 169 at their rear edges for engaging the keepers 65 of the drawers 15 when in closed position therein. The ears 172 and latches 169 are identical to the ears 72 and latch 69 on the single carrier frames.

It will be apparent that the multiple carrier frame with single drawer units therein attains all of the advantages of the single carrier frame plus the facility and minimal time required to mount one multiple frame rather than a number of single frames.

I claim:

1. A storage drawer unit comprising a carrier frame having a top wall and side walls provided with interior tracks inclined forwardly downward, a drawer slidable in said frame and having guide elements slidable in at least one of said tracks, a cover slidable over the top of said drawer, and latch means movably mounted on said top wall normally holding said cover retracted within said frame when the drawer is pulled out to a downwardly tilted position.

2. A storage drawer unit as in claim 1, in which forwardly open branch tracks are provided in said side walls connected with said inclined tracks to permit removal of the drawer by upward tilting and forward movement, and said latch means is adapted to release said cover from said frame when the drawer is tilted upwardly.

3. A storage drawer unit as in claim 1, in which the frame has at least one center rail with tracks matching the side wall tracks for slidably supporting multiple drawers, and latch means are movably mounted on said top wall for normally holding the cover of each drawer retracted as the drawer is pulled out.

4. A storage drawer unit as in claim 3, in which forwardly open branch tracks are provided in said side walls and center rail connected with the inclined tracks thereon to permit removal of each drawer by upward tilting and forward movement, and each of said latch means is adapted to release a drawer as it is pulled out.

5. A storage drawer unit as in claim 1, in which said latch means comprises cooperating latch and keeper means on said top wall and the rear end of said cover for normally holding said cover retracted in said frame when the drawer is pulled out to a downwardly tilted position.

6. A storage drawer unit as in claim 2, in which said latch means comprises cooperating latch and keeper means on said top wall and the rear end of said cover for normally holding said cover retracted in said frame when the drawer is pulled out to a downwardly tilted position.

7. A storage drawer unit as in claim 1, in which the latch means comprises an upwardly projecting keeper on the rear end of said cover, and a downwardly projecting latch having a resilient hinge mounting on said top wall, said latch adapted to snap into holding engagement with said keeper as the drawer and cover are pushed rearwardly to closed position.

8. A storage drawer unit as in claim 2, in which the latch means comprises an upwardly projecting keeper on the rear end of said cover, and a downwardly projecting latch having a resilient hinge mounting on said top wall, said latch adapted to snap into holding engagement with said keeepr as the drawer and cover are pushed rearwardly to closed position, and to be released from the keeper when the drawer is tilted upwardly.

9. A storage drawer unit as in claim 2, in which the front ends of said inclined tracks are closed to limit forward movement of the drawer to a downwardly tilted position.

10. A storage drawer unit as in claim 4, in which the front ends of said inclined tracks are closed to limit forward movement of each of the drawers to downwardly tilted position.

11. A storage drawer unit as in claim 3, in which a transverse reinforcing bar extends between said side walls and through said center rail.

12. A storage drawer unit as in claim 4, in which a transverse reinforcing bar extends between said side walls and through said center rail.

13. A storage drawer unit as in claim 1, in which opposed channels extend longitudinally along the top of said drawer for slidably receiving the side edges of said cover.

14. A storage drawer unit as in claim 2, in which opposed channels extend longitudinally along the top of said drawer for slidably receiving the side edges of said cover.

References Cited

UNITED STATES PATENTS

| | | | |
|---|---|---|---|
| 2,763,526 | 9/1956 | Falek | 312—270 |
| 2,813,653 | 11/1957 | Grossman | 312—270 X |
| 3,071,288 | 1/1963 | Gantner | 221—46 |
| 3,464,749 | 9/1969 | Bishop | 312—242 X |

CASMIR A. NUNBERG, Primary Examiner

U.S. Cl. X.R.

312—270